US010033599B2

(12) United States Patent
Fisher et al.

(10) Patent No.: US 10,033,599 B2
(45) Date of Patent: Jul. 24, 2018

(54) INTERMEDIATE PROCESS FOR INTEGRATING EXTERNAL SOCIAL NETWORK INCIDENTS INTO AN INCIDENT MANAGEMENT PIPELINE

(71) Applicant: Oracle International Corporation, Redwood Shores, CA (US)

(72) Inventors: Ben Fisher, Bozeman, MT (US); Kevin Dean Miller, Belgrade, MT (US); Kevin Fenger, San Francisco, CA (US); Hari Krishna Menon, Coppell, TX (US); Timothy Gradl, South Jordan, UT (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 199 days.

(21) Appl. No.: 14/960,154

(22) Filed: Dec. 4, 2015

(65) Prior Publication Data
US 2017/0163498 A1 Jun. 8, 2017

(51) Int. Cl.
G06F 15/16 (2006.01)
H04L 12/24 (2006.01)
G06Q 50/00 (2012.01)

(52) U.S. Cl.
CPC ........ *H04L 41/5074* (2013.01); *G06Q 50/01* (2013.01); *H04L 41/5009* (2013.01); *H04L 41/5019* (2013.01); *H04L 41/5032* (2013.01)

(58) Field of Classification Search
CPC .. H04L 41/5032; H04L 41/5074; G06Q 50/01

USPC ................. 709/202–203, 223–224, 217–219
See application file for complete search history.

(56) References Cited

U.S. PATENT DOCUMENTS

| 8,667,102 | B1 * | 3/2014 | Winters | ............... H04L 67/141 709/217 |
| 8,713,165 | B2 * | 4/2014 | Bharadwaj | .......... H04L 41/0253 709/201 |
| 2007/0266138 | A1 * | 11/2007 | Spire | .................... G06F 11/0709 709/223 |
| 2012/0030282 | A1 * | 2/2012 | Brody | .................... G06Q 50/01 709/203 |
| 2015/0222503 | A1 * | 8/2015 | Bansal | ................... H04L 43/022 709/224 |
| 2016/0112287 | A1 * | 4/2016 | Farmer | ............... H04L 41/0622 709/224 |

(Continued)

*Primary Examiner* — Bharat N Barot
(74) *Attorney, Agent, or Firm* — Kilpatrick Townsend & Stockton LLP

(57) ABSTRACT

A method of quantifying resolution times through external networks includes receiving, from an external network, a transmission indicating an incident. The transmission includes a first time at which an indication of the incident was posted to the external network. The method may also include generating an incident record associated with the incident, submitting the incident record to an incident management process to resolve the incident, and receiving an indication that the incident is resolved. The method may additionally include submitting a request to the external network to post the indication that the incident is resolved, and receiving, from the external network, a second time at which the indication that the incident is resolved was posted by the external network.

20 Claims, 12 Drawing Sheets

(56) References Cited

U.S. PATENT DOCUMENTS

2017/0091617 A1\* 3/2017 Baughman ............... G06N 3/08
2017/0103330 A1\* 4/2017 Gagne ................. G06F 17/5009

\* cited by examiner

INTERMEDIATE PROCESS FOR INTEGRATING EXTERNAL SOCIAL NETWORK INCIDENTS INTO AN INCIDENT MANAGEMENT PIPELINE

BACKGROUND

Incident management is is an information technology (IT) service management process area. The primary goal of incident management processes to restore a normal service operation as quickly as possible while minimizing the impact on other operations. A normal service operation is defined by a service-level agreement (SLA) between the incident management team and the customer. Traditionally, incidents are reported to the incident management team by way of email, call center telephone records, and/or Web forms. Once an incident is received, the incident management team can define an incident ticket that can work its way through an incident management pipeline until it is resolved. Timing requirements in the SLA can define maximum times allowable for resolving an incident. These timing requirements are generally defined starting with a time that an incident is reported to the incident management team and ending with a time at which the incident is resolved.

BRIEF SUMMARY

In some embodiments, a method of quantifying resolution times through external networks may include receiving, from an external network, a transmission indicating an incident. The transmission may include a first time at which an indication of the incident was posted to the external network. The method may also include generating an incident record associated with the incident, submitting the incident record to an incident management process to resolve the incident, and receiving, from the incident management process, an indication that the incident is resolved. The method may additionally include submitting a request to the external network to post the indication that the incident is resolved and receiving, from the external network, a second time at which the indication that the incident is resolved was posted by the external network.

In some embodiments, a non-transitory computer-readable medium may be presented. The computer-readable memory may comprise a sequence of instructions which, when executed by one or more processors, causes the one or more processors to perform operations including receiving, from an external network, a transmission indicating an incident. The transmission may include a first time at which an indication of the incident was posted to the external network. The operations may also include generating an incident record associated with the incident, submitting the incident record to an incident management process to resolve the incident, and receiving, from the incident management process, an indication that the incident is resolved. The operations may additionally include submitting a request to the external network to post the indication that the incident is resolved and receiving, from the external network, a second time at which the indication that the incident is resolved was posted by the external network.

In some embodiments, a system may include one or more processors and one or more one or more memory devices including instructions that, when executed by the one or more processors, cause the one or more processors to perform operations including receiving, from an external network, a transmission indicating an incident. The transmission may include a first time at which an indication of the incident was posted to the external network. The operations may also include generating an incident record associated with the incident, submitting the incident record to an incident management process to resolve the incident, and receiving, from the incident management process, an indication that the incident is resolved. The operations may additionally include submitting a request to the external network to post the indication that the incident is resolved and receiving, from the external network, a second time at which the indication that the incident is resolved was posted by the external network.

In various implementations of the embodiments described above, one or more of the following features may be included in any combination and without limitation. The method/operations may also include calculating an incident response time using the first time and the second time, comparing the incident response time to a predetermined maximum incident response time, and generating incident response report based on comparing the incident response time to the predetermined maximum incident response time. The method/operations may additionally include storing a third time at which the incident record is generated and storing a fourth time at which the indication that the incident is resolved is received from the incident management process. A first entity may provide a computer system executing the method, and the external network may be operated by a second entity that is independent from the first entity. The external network may include a social media network. The method/operations may further include, after submitting the request to the external network to post the indication that the incident is resolved, receiving an indication from the external network that posting was unsuccessful and submitting a second request to the external network to post the indication that the incident is resolved. The incident management process may include an incident table in a database assigned specifically to the incident record that records actions taken to resolve the incident. The indication that the incident is resolved may be stored in a database table that stores indications that are to be posted to a plurality of external networks. The method/operations may also include executing a process that cycles through the database table that stores the indications that are to be posted to the plurality of external networks, where the process stores retry indications in the database table and sequentially retries sending the indications that are to be posted after posting failures. The incident management process may store the incident record in an incident table. The incident table may include a channel column specifying the type of external network and a source column specifying a delivery method from the external network.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1:
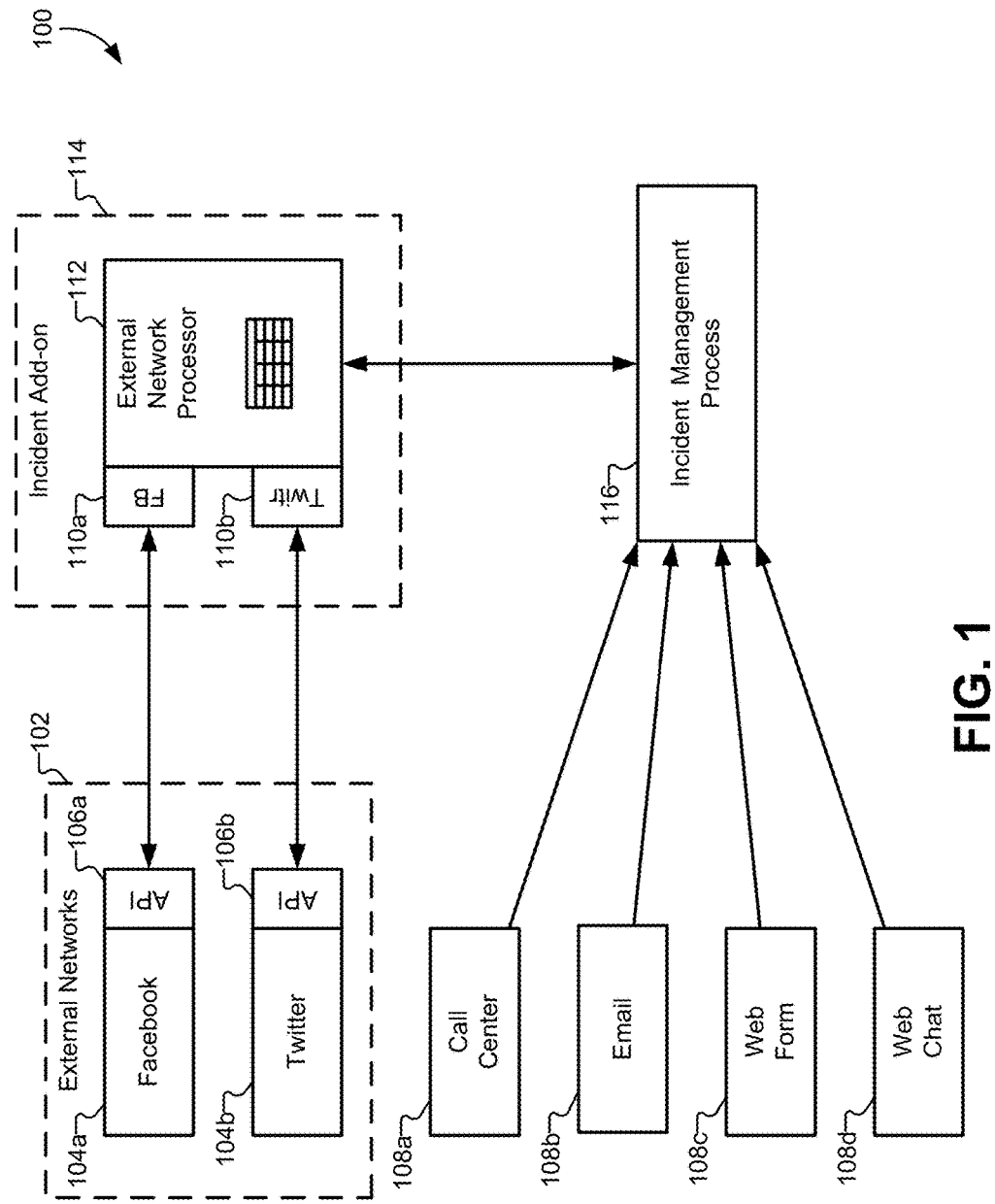
FIG. 1 illustrates a block diagram of an incident management system with an add-on for handling incidents arising in external networks, according to some embodiments.

Described herein, are embodiments for accurately measuring response times and handling incidents generated by external networks. Prior to this disclosure, incident management systems received indications of incidents through traditional means, such as customer service call centers, email transmissions, web forms, live chats, and/or the like. However, as modern forms of mass communication and social media proliferate, users tend to search the web at large for solutions to technical issues and to voice concerns when they arise. Social media in particular is a valuable medium for mass communication and consulting a large group of users to address technology incidents. Users often wonder, "is anyone else having my same problem?" and they often turn to social media to discuss their technical problems and look for solutions. The embodiments described herein allow an incident management process to harness the power of social media by collecting user expressions of product problems and generating incidents handled by the incident management process in a way that timing requirements can be accurately measured and evaluated.

The method and timing by which incidents are handled by an incident management provider are generally governed by a Service Level Agreement (SLA). An SLA between an incident management provider and a customer will generally define terms such as a maximum response time for handling particular types of incidents. For example, when an incident is received by email, the SLA can define a maximum response time of one hour. The response time is measured from the moment the email is received until the moment a reply email is sent to the user indicating that the incident is resolved. This response time can be compared to a maximum response time defined by the SLA and used to generate a quality report that shows how well the incident management provider is adhering to the SLA agreement.

Integrating social media as a source for discovering and handling incidents presents a number of technical, computer-based problems that are addressed by the embodiments described herein. Specifically, incidents generated on external networks including social media are not directly tied to a computer system for managing incidents. A user might post an indication of an incident in a comments section of a blog or on their Facebook feed, and this indication might sit for hours before the incident management system becomes aware of it. Similarly, once the incident is resolved, the incident management system may send a response to the external network where the incident originated; however, the response may be delayed while the external network posts the response. Given the variable timing associated with incidents arising on external networks, capturing and evaluating accurate response times is very difficult.

The embodiments described herein utilize the Application Programming Interfaces (APIs) that are generally integrated into external networks. For example, the Twitter API can allow an incident management system to search for tags or posts that mention a product or service. Additionally, the customer may have a social media presence and may receive direct messages through the social network. The API can retrieve posts, tags, likes, comments, and so forth that indicate the occurrence of incident. Along with such content, the API can also return a time at which the indication of the incident was first posted to the external network. This time can be used as a metric defined by the SLA in determining overall response time. Similarly, when the incident is resolved, an indication that the incident is resolved can be posted to the external network. The external network can provide a post time that can also be used as a metric defined by the SLA to determine and evaluate response times.

To explain the operation of various embodiments, the terms "incident management provider," "customer," and "user" will be used throughout this disclosure. The customer refers to any customer of the incident management provider. The customer will generally provide goods or services to users. The users purchase goods or services, such as software, data storage, cloud services, and/or the like from the customer, and generally report problems with these goods or services as incidents. The incident management provider is contracted by the customer to handle incidences that are discovered and reported by users.

As used herein, the term "incident" refers to any actual or perceived problem with goods or services provided by the customer. Incidents are generally discovered and made public by users; however, incidents can also be discovered and reported by the customer itself. An incident may refer to an actual problem, such as a network outage. An incident may also refer to a perceived problem, such as a user having difficulty understanding how to use a service that is functioning properly.

Generally, these embodiments deal with retrieving and servicing incidents arising on external networks. The term "external networks" refers to any computer network that is separate from the incident management provider and the customer. The external networks may be operated by an entity that is different from entities operating the incident management provider and/or the customer. External networks may include social media platforms, such as Facebook, Twitter, blog posts, comment sections of web articles, Reddit threads, chat rooms, and/or the like. The remainder of this disclosure will use two specific external networks—Facebook and Twitter—as examples in providing a detailed description of the operation of certain embodiments. It will be understood that Facebook and Twitter are merely examples of external networks, and that no embodiment should be limited to Facebook, Twitter, or any other particular type of external network. In light of this disclosure, one having skill in the art could adapt the methods and systems described herein to any other type of external network.

FIG. 1 illustrates a block diagram 100 of an incident management system with an incident add-on 114 for handling incidents arising in external networks 102, according to some embodiments. An incident management process 116 may receive incident reports from a variety of incident sources 108, such as call centers 108a, email 108b, web forms 108c, online chat sessions 108d, and so forth. Each of these incidents sources 108 can be fed into the incident management process 116, where incident records are generated and handled by automated systems or human troubleshooters.

In some embodiments, an incident add-on 114 can be integrated with an existing incident management process 116. The incident add-on 114 can be configured to interact with the Application Programming Interfaces (APIs) 106 of one or more external networks 102. External networks such as Facebook 104a and/or Twitter 104b each provide their own APIs 106 that are customized to allow for automated retrieval and analysis of information posted to their respective networks. The incident add-on 114 may include custom interfaces 110 that are specifically programmed to interact with the APIs 106 of the external networks 102. For example, a Twitter interface 110b can be programmed to request Tweets that include hashtags related to products/services provided by the customer.

The incident add-on 112 may also include a external network processor 112 that is configured to receive information from the external networks 102, determine whether they are indications of an incident, and then translate those indications into an input format recognized by the incident management process 116. The external network processor 112 may include database tables that track and store information specific to external networks 102 that may not be applicable to the other incident sources 108. This configuration allows the incident management process 116 to treat incidents arising in external networks 102 just like incidents arising in any of the other incidents sources 108. The information that is unique to external networks 102 is stored and managed by the incident add-on 114, including at least some of the timing information for retrieving indications of incidents and posting responses.

Although FIG. 1 illustrates an embodiment where the circuitry and programming for handling incidents arising in external networks 102 are represented by an incident add-on 114, other embodiments may simply integrate the ability to interact with external networks 102 into the incident management process 116 itself. Thus, a first embodiment uses the incident add-on 114 as a way to upgrade an incident management process 116 that is already installed and operational. This provides a technical solution for situations where external network incidents need to be integrated into a customer's operations without redesigning the entire incident management process 116. A second embodiment would treat the external networks 102 just like any other of the incident sources 108. The second embodiment provides a technical solution for instances where the incident management process 116 is being designed, redesigned, or undergoing a significant upgrade.

Figure 2:
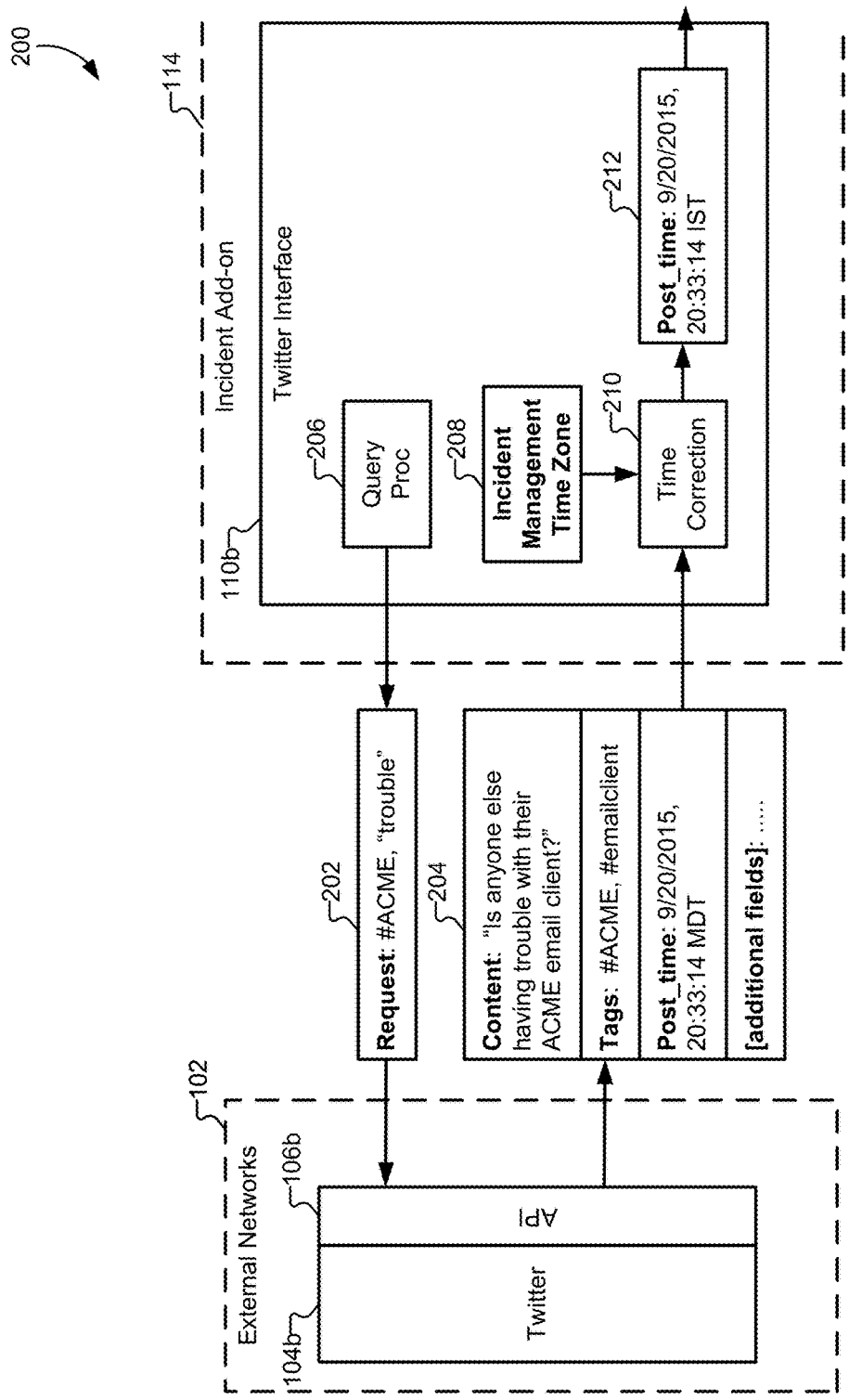
FIG. 2 illustrates a block diagram of a transmission for receiving incident timing and details from an external network, according to some embodiments.

FIG. 2 illustrates a block diagram 200 of queries and responses sent to and from an external network, according to some embodiments. FIG. 2 uses a particular external network, Twitter 104b, as an example of how incidents can be identified and retrieved from an external network; however, it will be understood that Twitter is merely exemplary and not meant to be limiting. The operations described in relation to FIG. 2 and any of the proceeding FIGS. can be readily applied to any type of external network.

The Twitter interface 110b in the incident add-on 114 may include a query process 206 that periodically generates queries for the Twitter API 106b. Queries may include instructions formatted in the specific query language defined by the Twitter API 106b that is readily available to one having skill in the art. For example, the query process 206 may generate queries that retrieve all Twitter posts that include a hashtag related to a product/service provided by the customer. The query process 206 may also generate queries that retrieve all posts or direct messages to a customer's Twitter feed. Queries may also be designed that retrieve mentions of the customer or products/services provided by the customer in the text of the Tweet. Some queries may use natural language processing techniques to search for Tweets that express frustration or dissatisfaction with a product or service. By way of example, the query process 206 can generate a query 202 that searches for Tweets with a hashtag of the customer (#ACME) and mention the word "trouble" in the text of the Tweet. The specific types of queries that may be designed will be specific to each customer and dependent on the API 106 of the particular external network.

Each API 106 may return data in a structured format that is specific to the particular external network. For example, the Twitter API 106b may return Tweets that match the query 202 as structured data 204 in a format that includes the content of the Tweet, any hashtags in the Tweet, specific users mentioned in the Tweet, and so forth. Additionally, the structured data 204 may include a post time that indicates a specific time at which the Tweet was posted to Twitter 104b. With each of the external networks 102, the response to the query generated by the query process 206 should include some form of post time that indicates when the structured data 204 was posted to the external network. The post time may be one of the timing requirements referenced by the SLA of the customer, and a response time may be measured from the post time, as it indicates a user's first public expression of an incident.

The query process 206 may act as a coarse filter that retrieves any posts to the external networks 102 that may indicate an incident. The interface 110 for each external network may also be configured to further filter the results by using natural language processing techniques in order to identify an intent for each of the posts to the external networks 102 and determine whether the intent indicates an incident. As used herein, the term "indication of an incident" may include any expression by a user that an incident has occurred in relation to a product or service provided by the customer. For example, the Twitter interface 110b can analyze the # and content of the structured data 204 and determine whether the Tweet represents an indication of an incident. An indication of an incident may also include any technical or automated feedback provided by the products or services provided by the customer, such as an automatically generated/transmitted error code.

If the interface 110 determines that the structured data 204 represents an indication of an incident, the structured data 204 can be forwarded to the external network processor 112 to be handled as an incident. Part of translating the structured data 204 into an incident may involve translating the post time of the structured data 204 into a time zone used by the incident management process 116. The incident management time zone 208 can be used as an input to a time correction process 210 that automatically translates the post time of the structured data 204 to a post time 212 that can be used by the incident management process 116. For example, if the incident management system is operating in India, posts from the United States would have their respective posts times translated to India Standard Time (IST).

Figure 3:
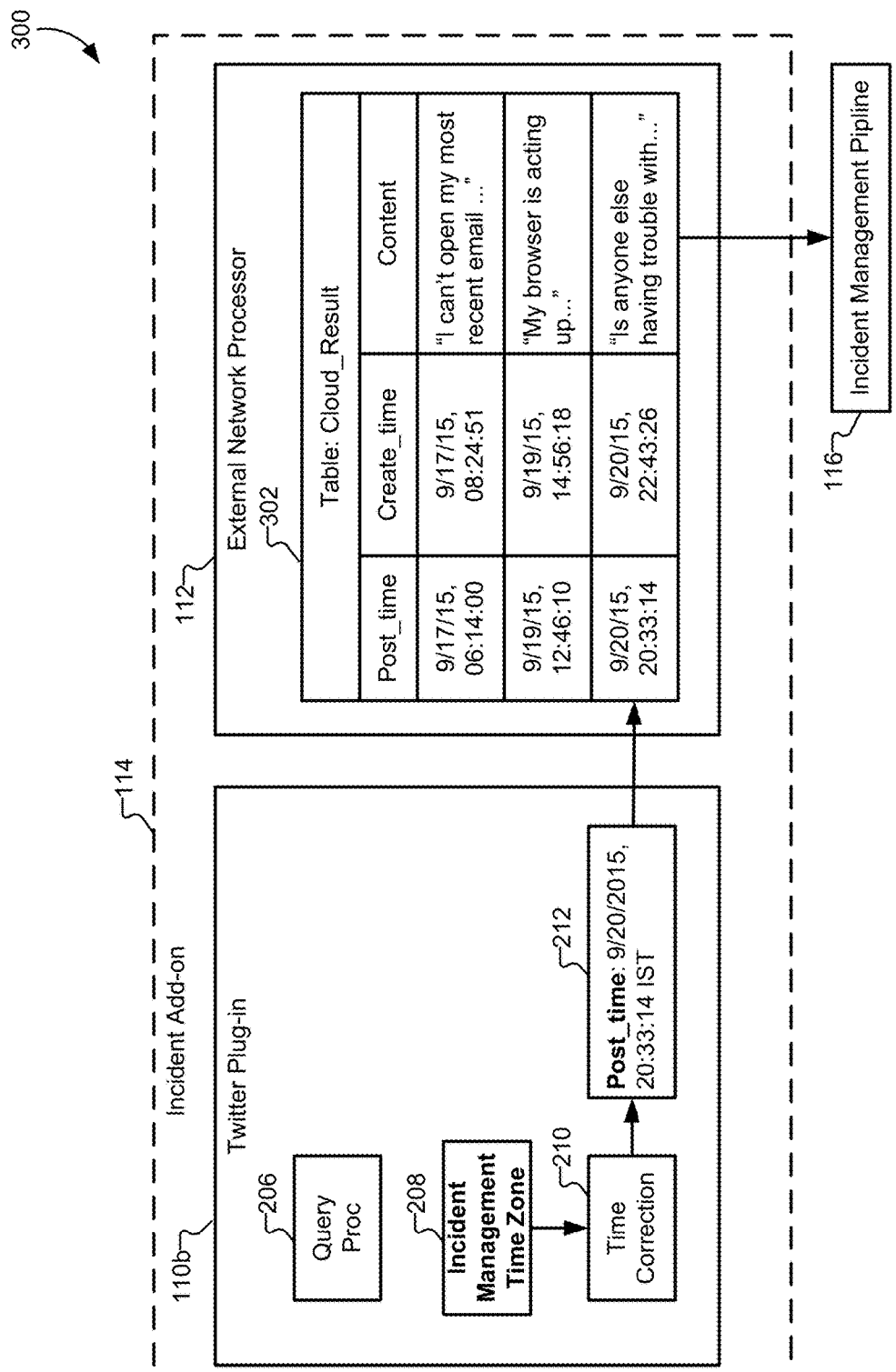
FIG. 3 illustrates a block diagram of a database table receiving an incident from an external network, according to some embodiments.

FIG. 3 illustrates a block diagram of a database table receiving an incident from an external network, according to some embodiments. The incident add-on 114 can pass at least a portion of the structured data 204 to the external network processor 112, including the translated post time 212. The external network processor 112 may include a database table 302 (e.g., a "cloud result' table for cloud-based external networks) that stores incident information. The database table 302 can store the post time representing a time that the indication of the incident was posted to the external network. The database table 302 can also store a "create time" that indicates when the external network processor 112 recognized the indication of the incident from the external network. The create time may also correspond to a time at which an entry in the database table 302 was instantiated. Additionally, the database table 302 may also store content, or information derived from content, received from the external network, such as the text of a Tweet identifying the specifics of an incident, or an intent category derived from the text of the Tweet.

The external network processor 112 stores the information in the database table 302 because it is specific to incidents arising in external networks. In a traditional incident management system, incidents are represented by records. The records indicate the time at which the record was created. The create time of the record is generally used for evaluating maximum response times to incidents. In contrast, incidents arising in external networks have a more complicated start time. In order to provide a more fine-grained analysis of a response time, the external network processor 112 may store the post time indicating when the post was uploaded to the external network and the create time indicating when the external network processor 112 recognized the incident. Because the post time and the create time are specific to incidents arising in external networks and not generally applicable to incidents arising from other incident sources, these times can be stored separately from incident records that are managed and navigated through the incident management process 116. This allows the incident management process 116 to treat all incident records the same without regard to the special timing requirements that may be applicable to incidents arising from external networks.

Figure 4:
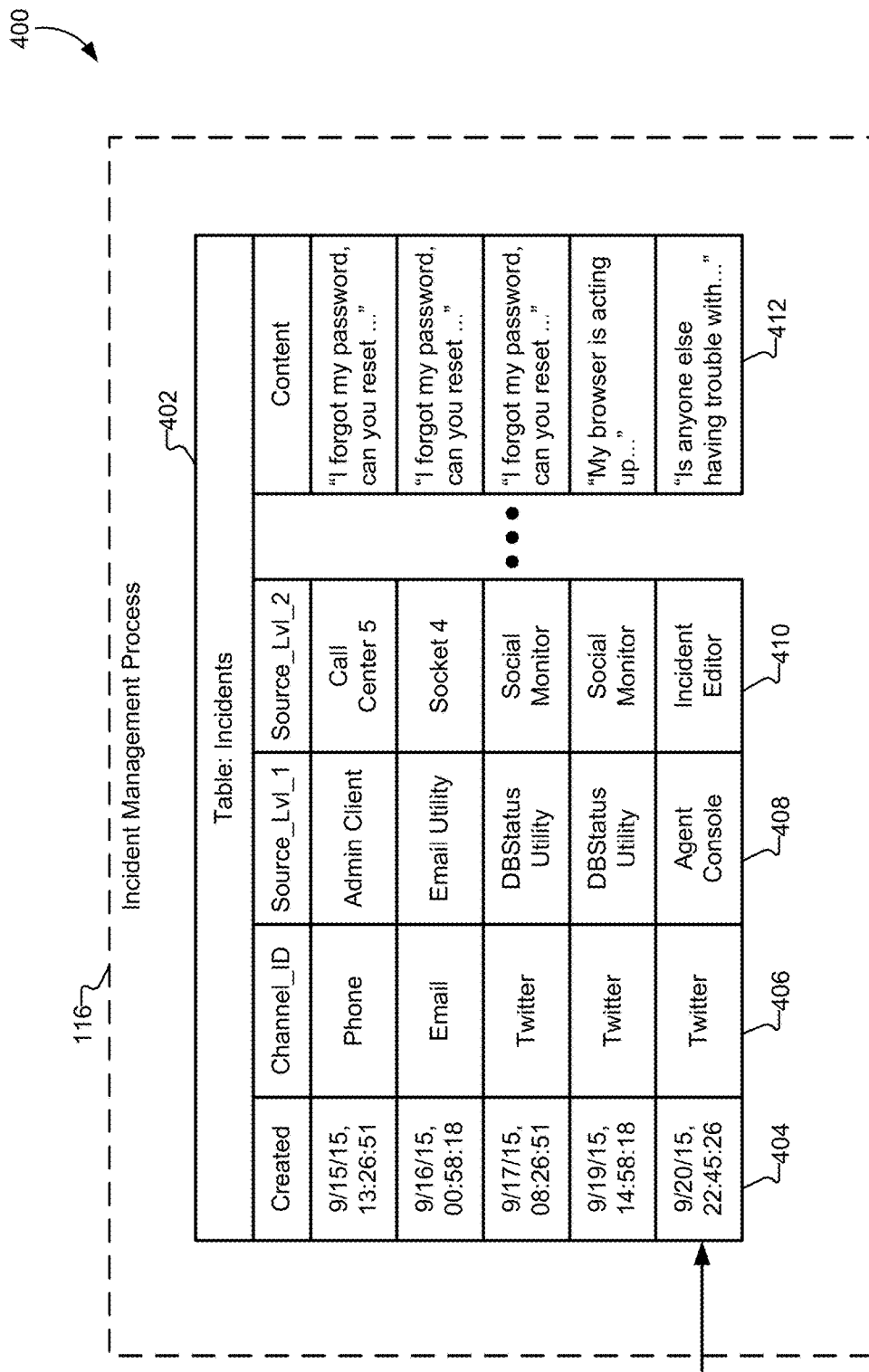
FIG. 4 illustrates an incident table in an incident management process, according to some embodiments.

FIG. 4 illustrates an incident table 402 in the incident management process 116, according to some embodiments. The incident add-on 114 translates the structured data 204 received from the external networks 102 into an incident format that is recognized by the incident management process 116. Thus, the input to the incident management process 116 from the incident add-on 114 may appear to be like any other incident from any other of the incident sources 108. An incident table 402 in the incident management process 116 tracks each incident as it is added to the queue by generating an incident record and adding the incident record as a row in the incident table 402. A third time of interest may be recorded by the incident table 402. As described above, a "create" time 404 stored in the incident table 402 indicates the time at which the incident record was created. This create time 404 for each record can also be used in evaluating response time metrics.

The incident table 402 may include a number of different columns that define the incident. Some of these columns may include a content or description 412 of the incident. Other columns may identify the source and channel through which the incident was received. A channel 406 may indicate the top-level source of the incident, such as phone, email, Twitter, Facebook, etc. Similarly, the first source level 408 and the second source level 410 identify specific routes, methods, or other characteristics of each particular channel. For example, the Twitter channel may include a direct message source, a Firehose feed, and/or the like. By identifying the detailed channel/source for each incident, the incident management process 116 can route responses to the correct destination. By specifying those source levels it allows the system to understand exactly how/where an incident event occurred and gives the system a much more detailed timeline of the events around incident management. In the example of FIG. 4, the source levels can be used to measure two different things: (1) when the agent's work is complete, and (2) when the system's work is complete. Depending on how an SLA is defined, the customer could use either one of these two metrics recorded by the system. For external networks, once an incident is resolved, the incident management process 116 can send an indication of the resolution back to the incident add-on 114. Specifically, the incident management process 116 can analyze the channel/source combination of the particular incident, and identify that the indication of the resolution should be sent to the incident add-on 114. By doing so, the incident management process 116 does not need to be programmed to deal with each specific external network. Instead, the incident management process 116 can simply resolve each incident and then rely on the incident add-on 114 to post the indication of the resolution of the incident to the correct external network in the correct format.

Figure 5:
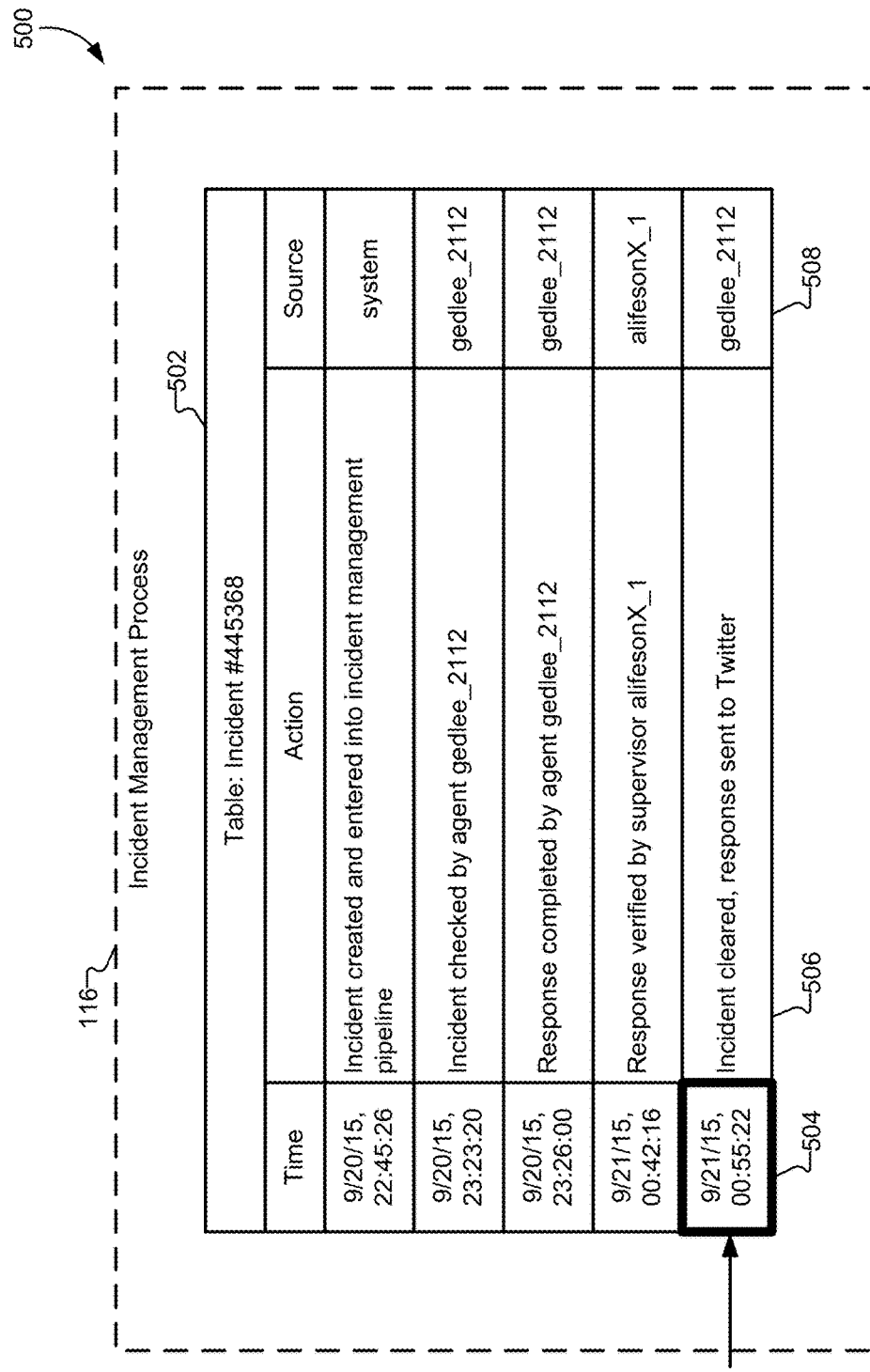
FIG. 5 illustrates a table for tracking incident resolution for a particular incident, according to some embodiments.

FIG. 5 illustrates a table 502 for tracking incident resolution for a particular incident, according to some embodiments. The table 502 may be stored in a database and is specific to a particular incident (#445368) from the incident table 402 of FIG. 4. Each incident in the incident table 402 may have its own table similar to table 502. Table 502 may be used to track progress toward resolving a particular incident. Table 502 may include a plurality of columns, including a column 504 specifying the time at which an action related to resolving the incident occurs, a column 506 comprising a description of an action taken, a column 508 indicating a person or computer system responsible for each action taken, along with additional columns not shown explicitly in FIG. 5. Actions taken may include assignment to a particular agent, repairs or upgrades made to a computer system, instructions and/or feedback provided to a user, supervisor comments and verifications, status reports, indications that the incident has been addressed and resolved, and so forth.

Each instance of table 502 for each incident includes an additional timing entry that may be useful for comparison with maximum response times in an SLA. As described above, at least three times of interest have been recorded thus far for incidents arising in external networks: a post time in the external network 102, a create time in the incident add-on 114, and a record creation time in the incident management process 116. Each incident—whether arising in an external network or not—will include a resolution time that indicates a time at which the service agent or computer system of the incident management process 116 resolved the incident. This is generally a time at which a technical solution for the incident has been completely executed, and is separate and distinct from times at which an indication that the incident has been resolved is transmitted or made available to the user. The resolution time may be stored in column 504 of table 502 in the example of FIG. 5.

Figure 6:
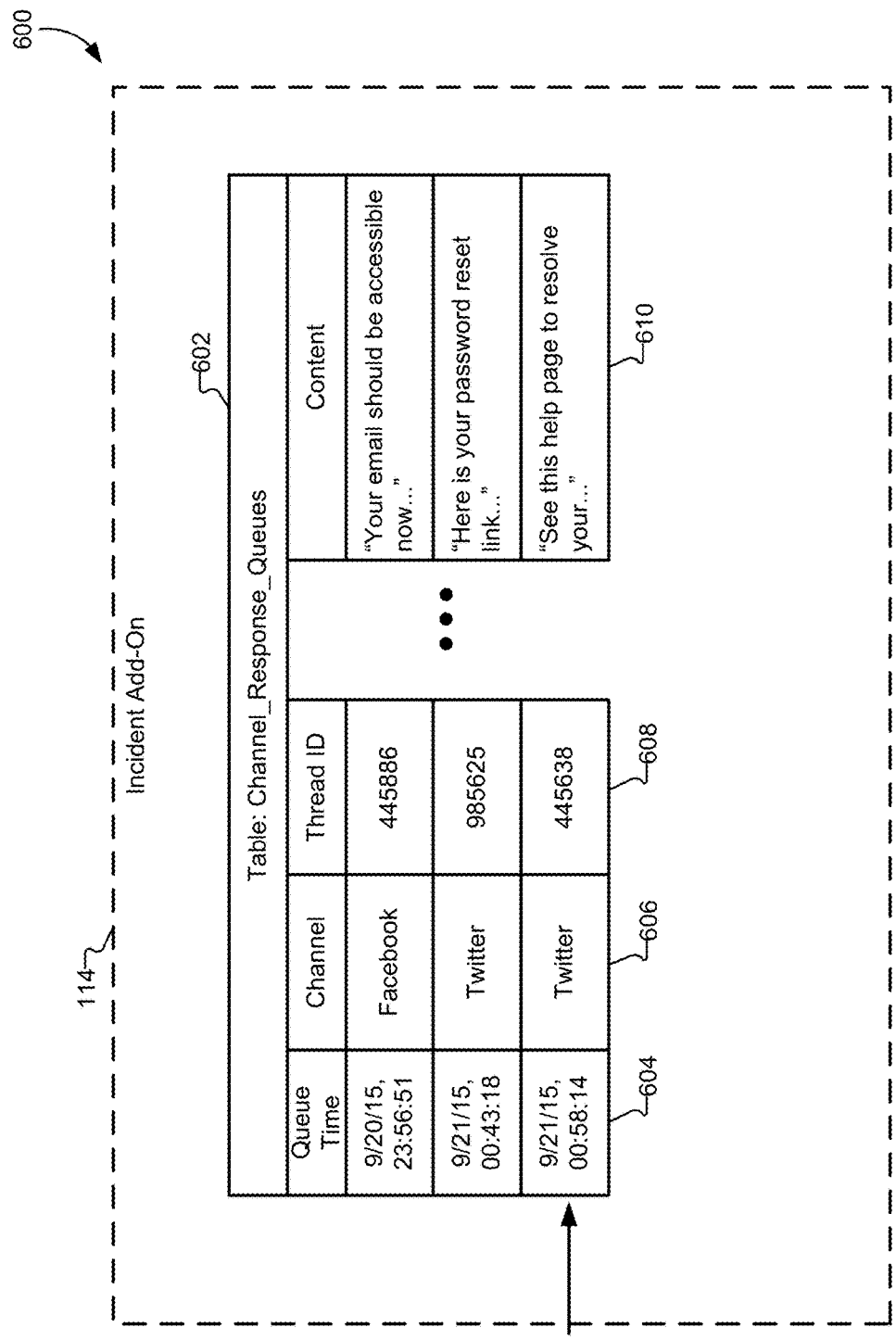
FIG. 6 illustrates a table for queuing incident responses for posting on an external network, according to some embodiments.

FIG. 6 illustrates a table 602 for queuing incident responses for posting on an external network, according to some embodiments. The channel response queue of table 602 is configured to store indications that the incident has been resolved specifically for incidents arising in external networks. Just as the timing requirements for receiving external network incidents differ from receiving traditional incidents, so do the timing requirements for responding to external network incidents differ from responding to traditional incidents. Traditional incident responses can be sent via email, telephone message, instant chat, or some other means of communication that is controlled by the customer. However, for incidents arising in external networks, the timing of posting responses to the external network is generally governed by the external network itself. For example, resolving an incident arising in the Twitter network may require posting a Tweet or other response to the Twitter network in such a way that the Tweet is sent to the original user who provided the indication of the incident. Because the reliability and timing of the external network is not under the control of the customer, it may not be sufficient to simply record the time at which the incident is resolved by the incident management process 116. Instead, the posting mechanics of the external network may add substantial delays that should be accounted for when measuring maximum response times against requirements of an SLA.

A special table, such as table 602, may be used to manage how responses are sent to the external networks. Table 602 may include a column 610 providing the content of the incident response, such as the content of a Tweet to be sent to a user, or the content of a Facebook post to be posted as a comment or on a user's feed. Table 602 may also include a column 606 that includes the channel response for each response. In alternate embodiments, separate channel response queues can be set up for each channel, such that there is a separate table for Twitter responses, a separate table for Facebook responses, and so forth. Some embodiments may also include columns for the source levels described above in relation to FIG. 4. The table 602 may also include other bookkeeping information, such as a thread ID 608. The table 602 may also include a column 604 indicating a time at which the response was entered into the response queue for the external networks. The times in column 604 may represent a time at which the response was entered as a row into table 602, or may represent a time at which the response in the row was sent to the corresponding external network. In some embodiments, column 610 providing the content of the incident response can be omitted from table 602. The content information can be looked up in other tables using the thread ID of column 608.

Figure 7:
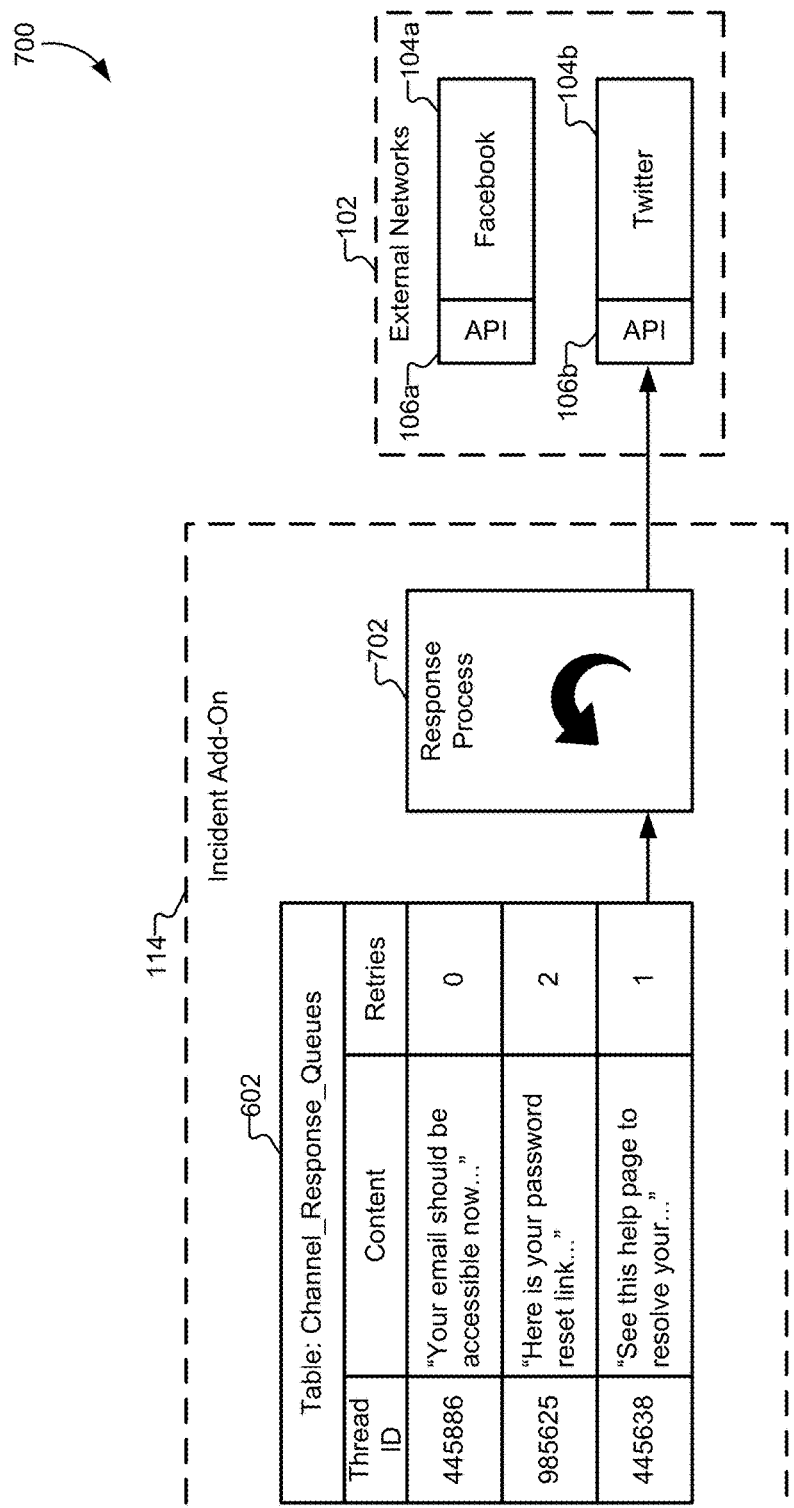
FIG. 7 illustrates a block diagram of a batch response process for posting responses to external networks, according to some embodiments.

FIG. 7 illustrates a block diagram of a response process 702 for posting responses to external networks 102, according to some embodiments. After populating the table 602, a response process 702 may sequentially transmit the responses in the response queue to the appropriate external network. The response process 702 can determine to which network the response should be sent based on the entry in the channel column of the table 602, or based on the table itself when each channel has its own response queue. An additional column 704 may be included in table 602 that specifies the number of retries used in posting the response to the corresponding external network. In some embodiments (not shown), additional columns may include a limit on the number of retries, timing information between each retry, a transmit time for each retry, and so forth. The response process 702 can periodically run through each entry in the table 602 and send responses to the corresponding external networks. Alternatively or additionally, the response process 702 can be triggered to send a response as soon as it is entered into the table 602. In this case, the times in column 604 representing the time at which the response was entered into table 602 may also represent the time at which the response was sent to the external network for posting.

After the response is sent to the external network by the response process 702, the incident management system may have little control over when and how the response is posted. Generally, responses are posted very quickly and without incident to external networks, but this is not always the case. Some external networks may require between minutes and hours from the time a post is received until the time a post is made publicly available on the external network. Therefore, an additional timing metric may be useful when analyzing maximum response times to an incident. In order to obtain this additional timing metric, a response from the external network can be used.

Figure 8:
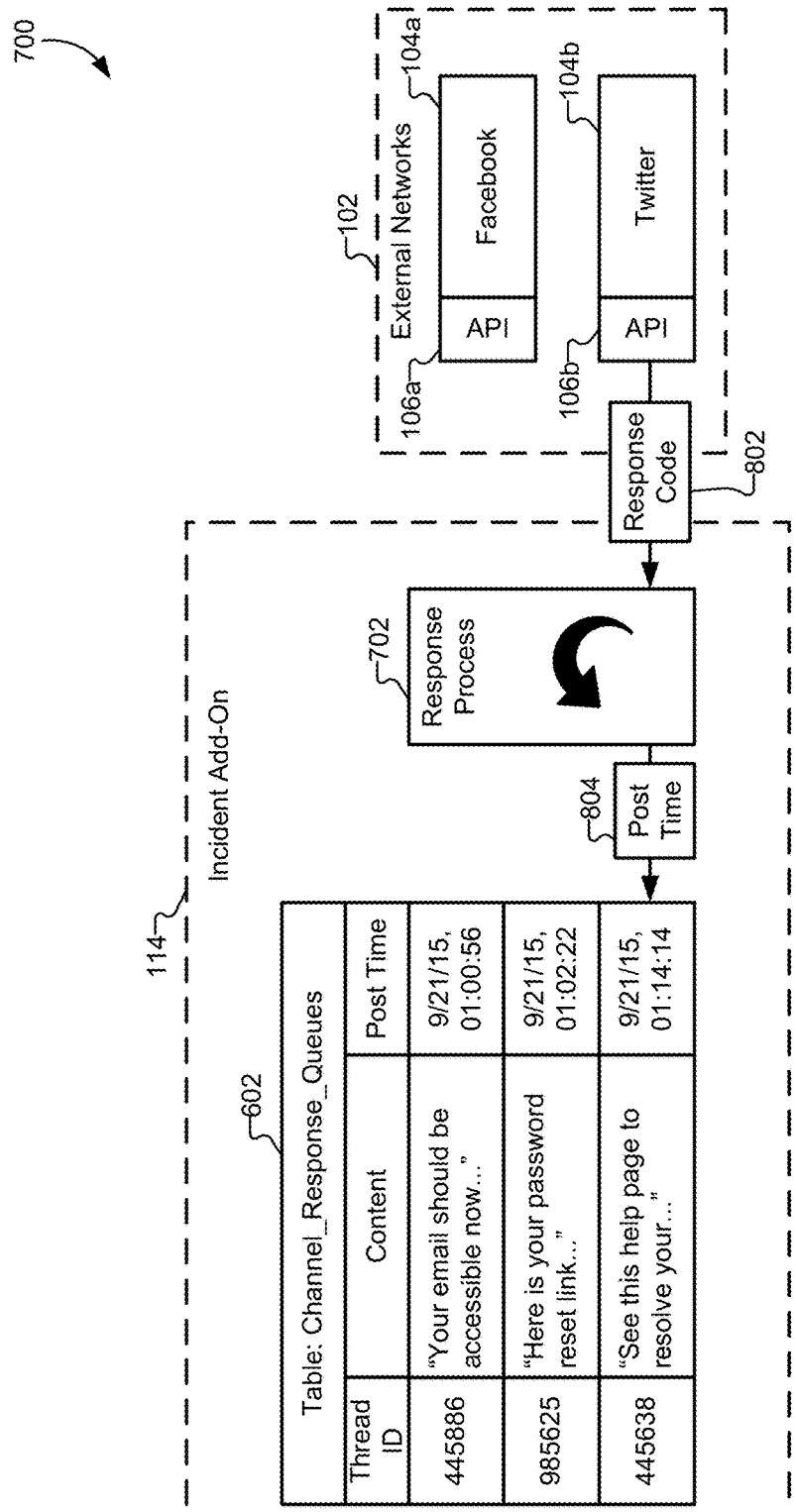
FIG. 8 illustrates a block diagram of a response generated by external networks in response to a post request, according to some embodiments.

FIG. 8 illustrates a block diagram of a response generated by external networks 102 in response to a post request, according to some embodiments. After a posting request is sent to an external network 102, the API 106 of the external network can send a response code 802 to the response process 702. The response code 802 can include different types of information in a structured data format related to the posting request. In some embodiments, the response code 802 may include a status of the post response (e.g., success or failure), and/or a post-time 804 if the post was successful. The response process 702 can extract the post from the response code 802 and store the post time in table 602. The post time 804 can also be stored in a separate timing metric table that records all of the times of interest as described above. In some embodiments, once a response is successfully sent from the channel response queue, the corresponding row can be removed from table 602. A historical record can then be written into table 502 as part of the incident record for the incident itself.

In cases where the response code 802 indicates a posting failure from the external network 102, the response process 702 can increment a retry counter in the corresponding row of table 602, and/or check a retry limit. The response process 702 can then again attempt to post a response that includes the indication that the incident has been resolved to the external network 102. In some embodiments, when a retry limit is exceeded, the response process 702 can take alternate measures to send a user an indication that the incident has been resolved. For example, the original indication of the incident received from the external network may include a username or handle for the user. This can be used to query an email address or other contact information from the external network 102. This contact information can then be used to generate an automated email, live chat, instant message, text message, and/or the like, alerting the user to the fact that the incident has been resolved.

After receiving the post time 804 from the external network 102, the incident management system will have recorded a plurality of different times that can be used to determine a response time as governed by an SLA. As described above, the incident management system will record (1) a time at which the indication of the incident is posted to the external network, (2) a time at which the indication of the incident is recognized by the incident management system and retrieved from the external network, (3) a time at which an incident record is created based on the indication of the incident from the external network, (4) a time at which the incident is resolved by the incident management network, (5) a time at which an indication that the incident is resolved is sent to the external network, and (6) a time at which the indication that the incident is resolved is actually posted to the external network. The incident management system can analyze one or more of these times for each incident and compare them to stored timing thresholds that are predetermined by an SLA. A report can be generated that uses these response times and provides a score for the incident management system that can be reported to the customer.

Figure 9:
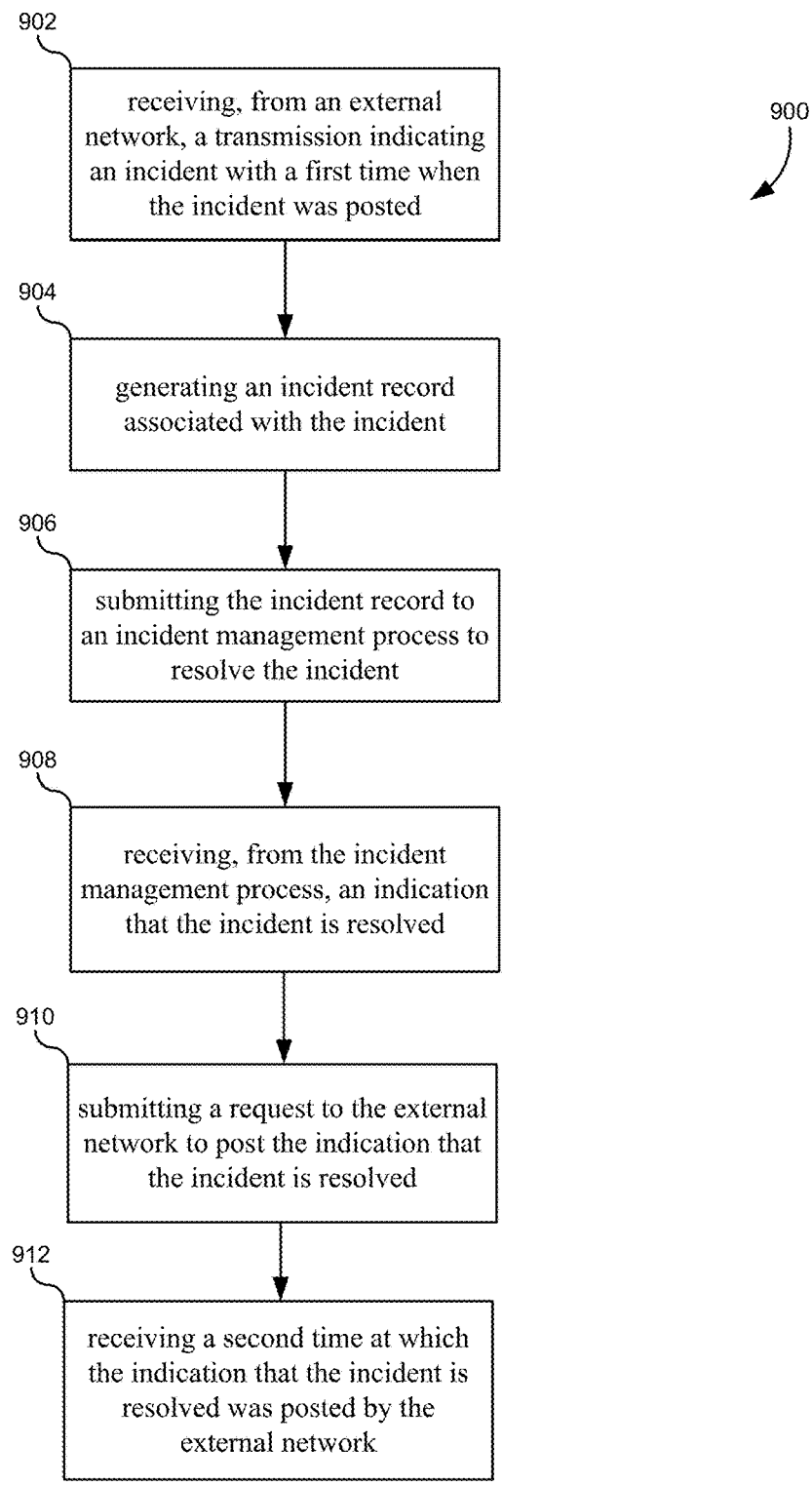
FIG. 9 illustrates a flowchart of a method of quantifying resolution times through external networks, according to some embodiments.

FIG. 9 illustrates a flowchart 900 of a method of quantifying resolution times for processing incidents through external networks, according to some embodiments. The method may include receiving, from an external network, a transmission indicating an incident. The transmission may include a "first" time when the incident was posted (902). The transmission may be received in response to a query sent to the external network that requests posts to the external network that have certain characteristics, such as including a certain hashtag or other textual indication of an incident involving the customer's products/services. The "first" time may be a time at which the incident was posted by a user. The transmission may be received from an incident add-on that is integrated with an existing incident management process. Alternatively, the transmission may be received from an incident management process that is specifically designed to handle both traditional incident indications as well as incident indications from external networks. The entity controlling the computer system executing the incident management process may be separate and independent from an entity that controls the external network. For example, the external network may comprise a social media network.

The method may also include generating an incident record associated with the incident (904). The first time may be stored separately from the incident record such that the incident record can be processed in the same manner as traditional incident records not arising in external networks. The incident record can be submitted to an incident management process that resolves the incident (906), and the incident management process can return an indication when the incident is resolved (908).

The method may also include submitting a request to the external network to post the indication that the incident is resolved (910). The indication that the incident is resolved may be stored in a table or queue that organizes outgoing incident responses to various external networks. Because the timing and success of posts to external networks is uncertain, the method may also include receiving a "second" time at which the indication that the incident is resolved is actually posted by the external network (912). In some cases, the request to the external network to post indication that the incident is resolved may return an indication that the post was unsuccessful. In these cases, the method may also include submitting a second request to the external network to post the indication of the incident is resolved.

In some embodiments, the method may additionally include calculating an incident response time using the first time the second time, along with other times described above, depending on the particular embodiment. The incident response time can be compared to a predetermined maximum incident response time and an incident response report can be generated based on the comparison. The predetermined maximum incident response time can be stored from an electronic SLA. As described above, the method may also include storing additional times, such as a "third" time at which the incident record was generated, and a "fourth" time at which the indication that the incident is resolved is received from the incident management system.

It should be appreciated that the specific steps illustrated in FIG. 9 provide particular methods of resolving incidents from external networks according to various embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system, such as computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 10:
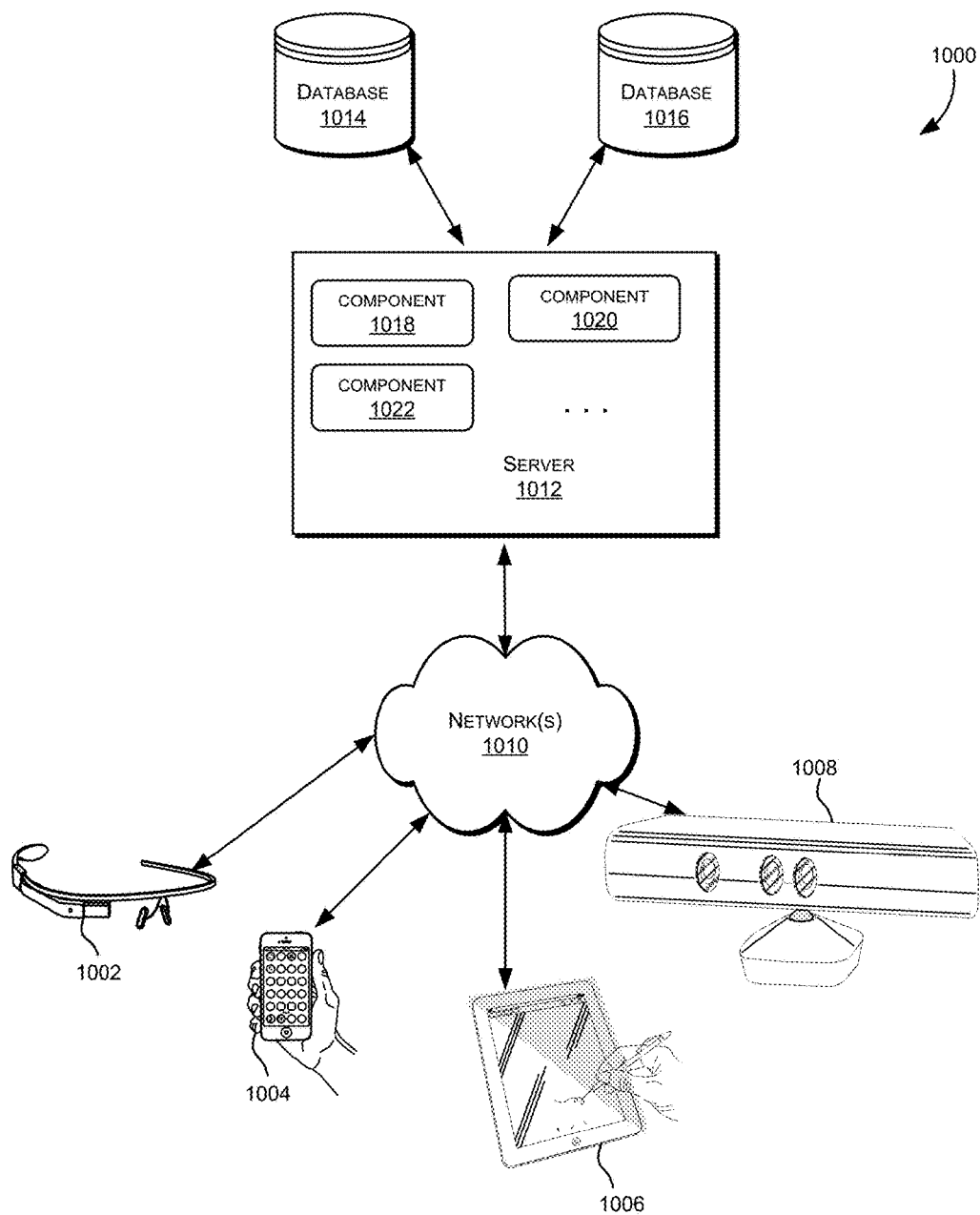
FIG. 10 illustrates a simplified block diagram of a distributed system for implementing some of the embodiments.

FIG. 10 depicts a simplified diagram of a distributed system 1000 for implementing one of the embodiments. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications provided by one or more of the components of the system. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in the figure, the software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in the figure is thus one example of a distributed system for implementing an embodiment system and is not intended to be limiting.

Client computing devices 1002, 1004, 1006, and/or 1008 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1002, 1004, 1006, and 1008 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1010.

Although exemplary distributed system 1000 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), such as one based on Ethernet, Token-Ring and/or the like. Network(s) 1010 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1012 may be adapted to run one or more services or software applications described in the foregoing disclosure. For example, server 1012 may correspond to a server for performing processing described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle, that are adapted to store, update, and retrieve data in response to SQL-formatted commands.

Figure 11:
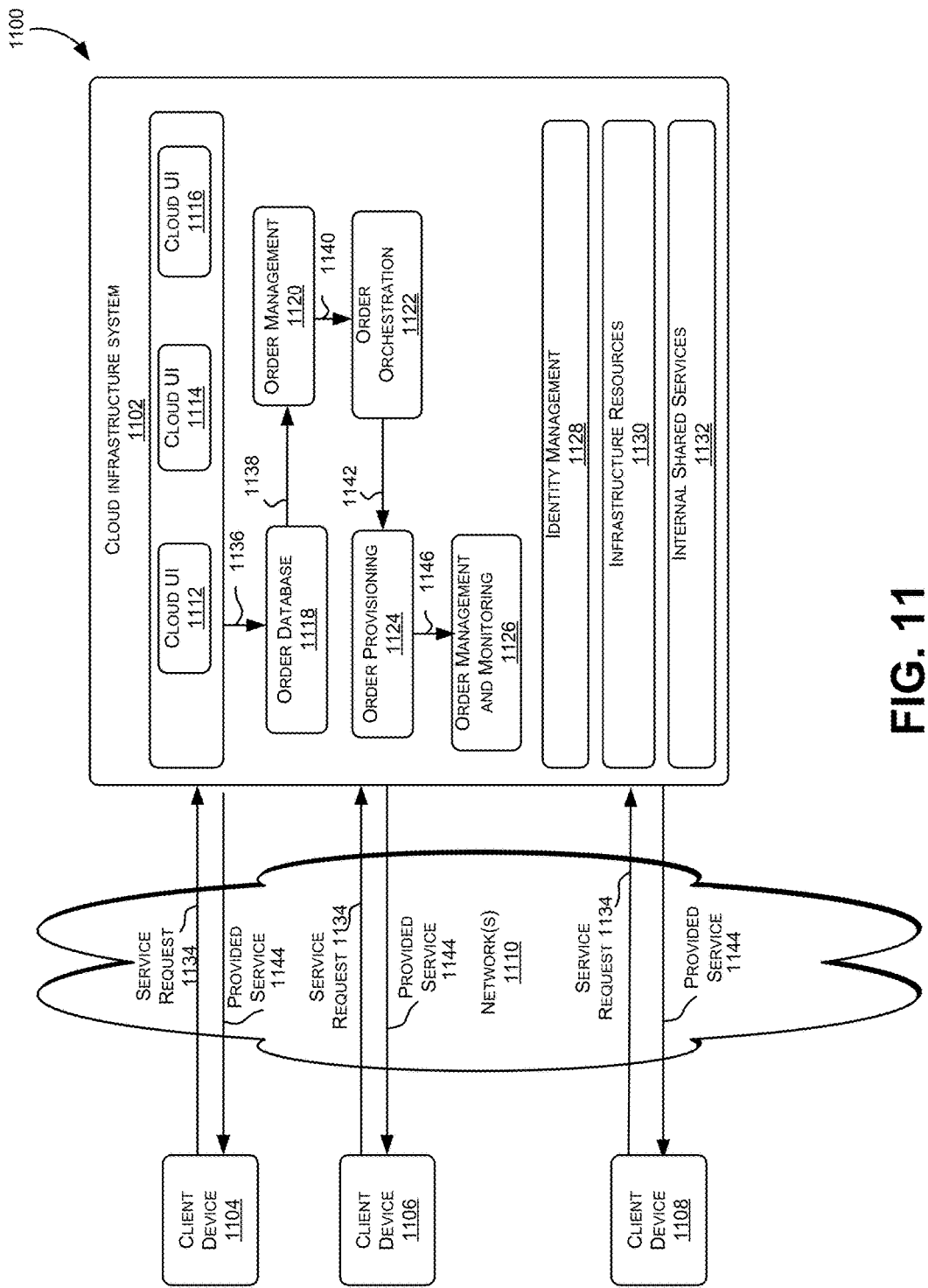
FIG. 11 illustrates a simplified block diagram of components of a system environment by which services provided by the components of an embodiment system may be offered as cloud services.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for 1002, 1004, 1006, and 1008.

Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols, including those described above for network(s) 1010.

Cloud infrastructure system 1102 may comprise one or more computers and/or servers that may include those described above for server 1012.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In exemplary operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116.

At operation 1136, the order is stored in order database 1118. Order database 1118 can be one of several databases operated by cloud infrastructure system 1118 and operated in conjunction with other system elements.

At operation 1138, the order information is forwarded to an order management module 1120. In some instances, order management module 1120 may be configured to perform billing and accounting functions related to the order, such as verifying the order, and upon verification, booking the order.

At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1100 may include an identity management module 1128. Identity management module 1128 may be configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
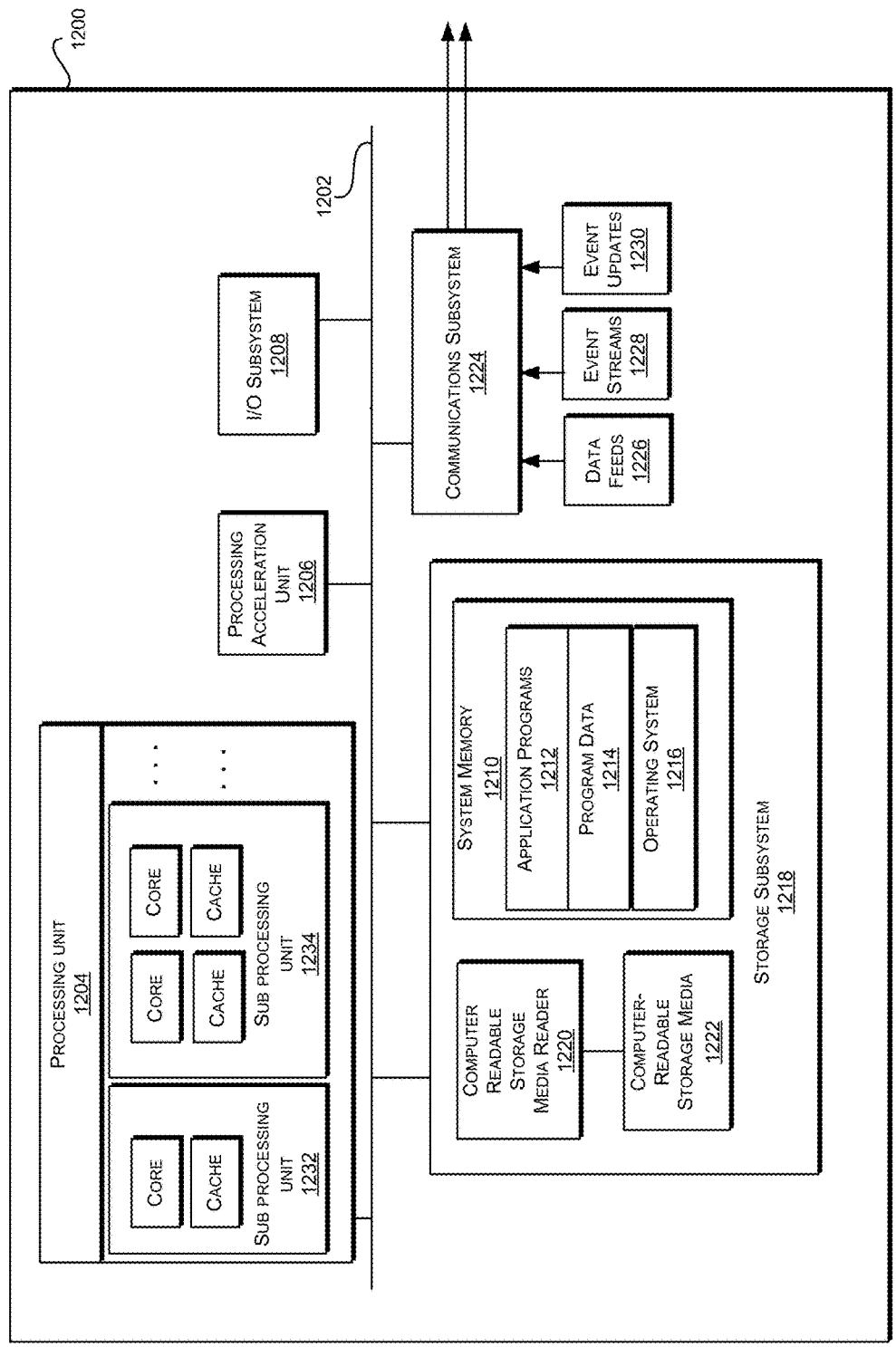
FIG. 12 illustrates an exemplary computer system, in which various embodiments may be implemented.

FIG. 12 illustrates an exemplary computer system 1200, in which various embodiments of the present invention may be implemented. The system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may comprise a storage subsystem 1218 that comprises software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1218 may also provide a tangible computer-readable storage medium for storing the basic programming and data constructs that provide the functionality of some embodiments. Software (programs, code modules, instructions) that when executed by a processor provide the functionality described above may be stored in storage subsystem 1218. These software modules or instructions may be executed by processing unit 1204. Storage subsystem 1218 may also provide a repository for storing data used in accordance with the present invention.

Storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments communications subsystem 1224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of quantifying resolution times through external social networks, the method comprising:

receiving, by an intermediate process and from an external social network, a transmission indicating an incident, the transmission comprising a first time at which an indication of the incident was posted by a user to the external social network, wherein the intermediate process is communicatively coupled between the external social network and an incident management process;

generating, by the intermediate process, an incident record associated with the incident;

submitting, by the intermediate process, the incident record to the incident management process to resolve the incident;

receiving, by the intermediate process and from the incident management process, an indication that the incident is resolved;

submitting, by the intermediate process, a request to the external social network to post the indication that the incident is resolved; and receiving, by the intermediate process and from the external social network, a second time at which the indication that the incident is resolved was posted to the user by the external social network.

2. The method of claim 1, further comprising:

calculating an incident response time using the first time and the second time;

comparing the incident response time to a predetermined maximum incident response time; and
generating incident response report based on comparing the incident response time to the predetermined maximum incident response time.

3. The method of claim 1, further comprising:
storing a third time at which the incident record is generated; and
storing a fourth time at which the indication that the incident is resolved is received from the incident management process.

4. The method of claim 1, wherein:
a first entity provides the intermediate process executing the method and the incident management process; and
the external social network is operated by a second entity that is independent from the first entity.

5. The method of claim 1, wherein the external social network comprises a social media network.

6. The method of claim 1, further comprising:
after submitting the request to the external social network to post the indication that the incident is resolved, receiving an indication from the external social network that posting was unsuccessful; and
submitting a second request to the external social network to post the indication that the incident is resolved.

7. The method of claim 1, wherein the incident management process comprises an incident table in a database assigned specifically to the incident record that records actions taken to resolve the incident.

8. The method of claim 1, wherein the indication that the incident is resolved is stored in a database table that stores indications that are to be posted to a plurality of external social networks.

9. The method of claim 8, further comprising executing a process that cycles through the database table that stores the indications that are to be posted to the plurality of external social networks, wherein the process stores retry indications in the database table and sequentially retries sending the indications that are to be posted after posting failures.

10. The method of claim 1, wherein the incident management process stores the incident record in an incident table, the incident table comprising:
a channel column specifying a type of external social network; and
a source column specifying a delivery method from the external social network.

11. A non-transitory computer-readable medium comprising instructions which, when executed by one or more processors, causes the one or more processors to perform operations comprising:
receiving, by an intermediate process and from an external social network, a transmission indicating an incident, the transmission comprising a first time at which an indication of the incident was posted by a user to the external social network, wherein the intermediate process is communicatively coupled between the external social network and an incident management process;
generating, by the intermediate process, an incident record associated with the incident;
submitting, by the intermediate process, the incident record to the incident management process to resolve the incident;
receiving, by the intermediate process and from the incident management process, an indication that the incident is resolved;
submitting, by the intermediate process, a request to the external social network to post the indication that the incident is resolved; and
receiving, by the intermediate process and from the external social network, a second time at which the indication that the incident is resolved was posted to the user by the external social network.

12. The non-transitory computer-readable medium according to claim 11, wherein the instructions cause the one or more processors to perform additional operations comprising:
calculating an incident response time using the first time and the second time;
comparing the incident response time to a predetermined maximum incident response time; and
generating incident response report based on comparing the incident response time to the predetermined maximum incident response time.

13. The non-transitory computer-readable medium according to claim 11, wherein the instructions cause the one or more processors to perform additional operations comprising:
after submitting the request to the external social network to post the indication that the incident is resolved, receiving an indication from the external social network that posting was unsuccessful; and
submitting a second request to the external social network to post the indication that the incident is resolved.

14. The non-transitory computer-readable medium according to claim 11, wherein the instructions cause the one or more processors to perform additional operations comprising executing a process that cycles through a database table that stores indications that are to be posted to a plurality of external social networks, wherein the process stores retry indications in the database table and sequentially retries sending the indications that are to be posted after posting failures.

15. The non-transitory computer-readable medium according to claim 11, wherein the incident management process stores the incident record in an incident table, the incident table comprising:
a channel column specifying a type of external social network; and
a source column specifying a delivery method from the external social network.

16. A system comprising:
one or more processors; and
one or more memory devices comprising instructions that, when executed by the one or more processors, cause the one or more processors to perform operations comprising:
receiving, by an intermediate process and from an external social network, a transmission indicating an incident, the transmission comprising a first time at which an indication of the incident was posted by a user to the external social network, wherein the intermediate process is communicatively coupled between the external social network and an incident management process;
generating, by the intermediate process, an incident record associated with the incident;
submitting, by the intermediate process, the incident record to the incident management process to resolve the incident;
receiving, by the intermediate process and from the incident management process, an indication that the incident is resolved;

submitting, by the intermediate process, a request to the external social network to post the indication that the incident is resolved; and receiving, by the intermediate process and from the external social network, a second time at which the indication that the incident is resolved was posted to the user by the external social network.

17. The system of claim 16 wherein the instructions further cause the one or more processors to perform additional operations comprising:

calculating an incident response time using the first time and the second time;

comparing the incident response time to a predetermined maximum incident response time; and generating incident response report based on comparing the incident response time to the predetermined maximum incident response time.

18. The system of claim 16 wherein the instructions further cause the one or more processors to perform additional operations comprising:

after submitting the request to the external social network to post the indication that the incident is resolved, receiving an indication from the external social network that posting was unsuccessful; and submitting a second request to the external social network to post the indication that the incident is resolved.

19. The system of claim 16, wherein the instructions further cause the one or more processors to perform additional operations comprising executing a process that cycles through a database table that stores indications that are to be posted to a plurality of external social networks, wherein the process stores retry indications in the database table and sequentially retries sending the indications that are to be posted after posting failures.

20. The system of claim 16, wherein the incident management process stores the incident record in an incident table, the incident table comprising:

a channel column specifying a type of external social network; and a source column specifying a delivery method from the external social network.

* * * * *

UNITED STATES PATENT AND TRADEMARK OFFICE
CERTIFICATE OF CORRECTION

PATENT NO. : 10,033,599 B2  
APPLICATION NO. : 14/960154  
DATED : July 24, 2018  
INVENTOR(S) : Fisher et al.

Page 1 of 1

It is certified that error appears in the above-identified patent and that said Letters Patent is hereby corrected as shown below:

In the Drawings

On sheet 3 of 12, in FIG. 3, under Reference Numeral 116, Line 1, delete "Pipline" and insert -- Pipeline --, therefor.

In the Specification

In Column 1, Line 8, after "management is" delete "is".

In Column 7, Line 17, delete "result'" and insert -- result" --, therefor.

Signed and Sealed this  
Fourteenth Day of May, 2019

Andrei Iancu  
*Director of the United States Patent and Trademark Office*